(12) United States Patent
Phipps (10) Patent No.: US 6,383,421 B1
(45) Date of Patent: May 7, 2002

(54) METHOD OF MANUFACTURING A GAS BURNING ARTIFICIAL LOG FROM SOL-GEL COMPOSITIONS

(76) Inventor: L. Myles Phipps, P.O. Box 663, Warren, PA (US) 16365

( * ) Notice: Subject to any disclaimer, the term of this patent is extended or adjusted under 35 U.S.C. 154(b) by 0 days.

(21) Appl. No.: 09/718,792

(22) Filed: Nov. 22, 2000

Related U.S. Application Data (63) Continuation-in-part of application No. 09/137,885, filed on Aug. 20, 1998, now abandoned.

(51) Int. Cl.[7] .......................... B29C 39/10; B29C 44/12
(52) U.S. Cl. .......................... 264/42; 264/46.7; 264/50; 264/279; 264/DIG. 6
(58) Field of Search .......................... 264/42, 50, 46.7, 264/279, DIG. 6

(56) References Cited

U.S. PATENT DOCUMENTS

| | | | | |
|---|---|---|---|---|
| 2,543,981 A | * | 3/1951 | Munao et al. | 264/279 |
| 3,678,144 A | | 7/1972 | Shoup | 264/42 |
| 3,778,283 A | | 12/1973 | Freyhold | 106/84 |
| 3,920,578 A | | 11/1975 | Yates | 252/313 |
| 4,083,728 A | | 4/1978 | Orso et al. | 106/52 |
| 4,112,032 A | | 9/1978 | Blaszyk | 264/42 |
| 4,160,238 A | | 7/1979 | Bergna | 260/29.6 |
| 4,221,597 A | | 9/1980 | Mallow | 106/74 |
| 4,521,136 A | | 6/1985 | Murphey | 405/263 |
| 4,786,618 A | | 11/1988 | Shoup | 501/12 |
| 4,871,694 A | | 10/1989 | Legare | 501/39 |
| 4,877,417 A | * | 10/1989 | Crace | 44/535 |
| 4,940,675 A | | 7/1990 | Bohlayer et al. | 501/12 |
| 5,271,888 A | * | 12/1993 | Sinsley | 264/87 |
| 5,800,875 A | * | 9/1998 | Hussong | 427/430.1 |
| 5,915,374 A | * | 6/1999 | Susany | 126/500 |
| 6,077,467 A | * | 6/2000 | Sinsley | 264/87 |
| 6,296,474 B1 | * | 10/2001 | Butler et al. | 431/125 |

* cited by examiner

Primary Examiner—Allan R. Kuhns
(74) Attorney, Agent, or Firm—David S. Thompson (57) ABSTRACT

An active log 20 includes a body made of porous ceramic material. A channel is defined within the active log, within which is carried a gas tube 40. A gas supply line 60 provides gas to the gas tube 40. Gas exhausted from holes defined in the gas tube moves through the porous material from which the active log is constructed, cooling the active log by convection. Due to the slightly greater gas pressure within the active log, gas moves outwardly through the porous material, until it is exhausted from pores on the surface of the active log. Contact with the ambient atmosphere results in combustion. Because the combustion is generally uniformly distributed about the external surface of the active log, and because there is no unsightly external burner from which gas is exhausted, the appearance of the active log is a realistic approximation of the burning surface of a real log. One or more passive objects, such as logs or rocks, constructed of a similar porous ceramic material may be used to provide additional realism without the need to pipe gas to a number of gas tubes 40.

5 Claims, 4 Drawing Sheets

METHOD OF MANUFACTURING A GAS BURNING ARTIFICIAL LOG FROM SOL-GEL COMPOSITIONS

CROSS-REFERENCES

This application is a continuation in part of an application filed Aug. 20 1998 having Ser. No. 09/137,885, now abandoned.

BACKGROUND

The ambiance and physical sensation associated with a natural flame such as those found in campfires and fireplaces are widely desired. But because of a number of economic and environmental issues, including the pollution and physical mess of wood burning, the use of wood-burning appliances and open campfires has been severely restricted in recent years. There have been a number of attempts to produce a realistic appearing system of synthetic logs, burning wood pellets, natural gas, propane, LPG, or butane that would duplicate the ambiance of wood burning without the liabilities. Several systems have reached the market place and have enjoyed some commercial success. However, none of these systems have achieved the appearance, ambiance, and functional realism of real wood fires.

Gas log devices currently are all constructed on a similar pattern. The gas is burned by allowing it to escape from a series of small holes in a metallic tube or more complex burner device. The burner is then positioned under an artificial log in an attempt to simulate a natural log. The resulting gas flame is then allowed to play across a series of artificial log shapes to produce the visual illusion that the logs are actually burning. Prior to the instant invention, in all cases, the degree of realism relies on successfully hiding the obviously artificial nature of the burner itself. This is usually accomplished by placing the burner and its flames below and/or behind one or more of the artificial logs. To enhance realism, the design of the shapes of the artificial logs and the placement of the burner restricts the viewing area of the flames to those areas that look most realistic and to prevent viewing of the burner. Thus, area over which the flame may be viewed is small. A more realistic design is impossible with this technology because much of the flame must be hidden from view to prevent view of the artificial burner from some angles, or view of jets of flame suggesting that gas rather than wood was being burned.

Using current technology, a designer of an artificial log device must somewhat restrict the view of the flames to those portions that appear more natural, such as the upper part of the flame. Similarly, view of the burner must be obstructed by placement of a log or other obstruction in the predicted line of view. Unfortunately, a trade-off results in that to completely obstruct the view of the burner, the view of the logs and flames must be excessively blocked. As a result, in most applications, the burner is sometimes visible and portions of the flame, which are somewhat attractive, are sometimes blocked from view.

The need to block the view of the burner severely restricts the emission of radiant energy, primarily infrared (IR), that can be emitted by the flame. For those designers hoping to capture a portion of the available heat from the device, it is then necessary to place a heat exchanger in the hot zone above the flames, and to provide a blower system to force the resulting heated air into the surroundings.

Using such heat transfer devices allows a person near the prior art artificial logs to feel warmth from a stream of moving hot air. The resulting sensation is unlike a real wood fire, in part because the IR does not warm the person. In fact, the radiant or IR portion of the available energy is simply lost, having been blocked by the artificial logs that prevent view of the burner. These disadvantages seriously degrade the sensory illusion of the fire and combine with visual discrepancies related to the use of burners and the need to block view of the lower portions of the flames.

The artificial logs of the current art are generally formed by one of two candidate technologies. In the older of these, a ceramic or cementitious material is cast into a mold. Sometimes the mold is derived from a natural log. As an alternative, particularly when the "log" shape needs to conform to a specialized geometric requirement of the fireplace or gas stove, the mold is created by copying a machined or carved piece of some easily worked material such as plaster, plastic foam or soft wood. This piece is generally a "positive" of the desired final log shape. From the man-made "positive," a "negative" is generally constructed of some material, which then provides the cavity into which the "log material" will be cast or otherwise placed. The "negative" provides copies (castings) that are as nearly identical as possible to the original positive. These pieces generally are lacking the realism of a natural piece of wood because of the extensive effort needed to actually duplicate the almost infinite complexity of a piece of natural wood, either split or bark covered. Another disadvantage is that the ceramic or cementitious material that is cast into such a mold is generally quite dense, hard, and of necessity must be quite refractory to allow it to withstand the play of flames over it at temperatures often exceeding 1300 F. Given these design and performance constraints, it is not surprising that these high-density logs are not "active" in the sense of contributing more than their physical shape to the creation of the fire illusion. And in fact, they actually act as a large heat sink, absorbing both the visible light and the IR emitted by the flames, significantly reducing the warmth, which would otherwise be radiated. A person sitting by the fire feels very little warmth and sees very little light. In a dimly lit room, the logs are generally only visible as a dark profile, while the flames play around them in a predetermined and usually near-static pattern. This is not a very convincing illusion of a real wood fire, and is not a very efficient or pleasant way to provide heat to the room. For applications involving portable campfires, these logs would be wholly unsuitable because they are very heavy. A set of such logs would generally involve the use of 1–2 gallons of the liquid castable material to provide the necessary log shapes, and therefore would typically weigh approximately 30–40 lbs, not including all the accompanying fittings and other structure. This excessive weight would make design of any portable device difficult or impossible.

A more modern alternative method of creating the artificial logs employs the technology of vacuum-formed ceramic fibers to produce lightweight log shapes. These ceramic fiber logs are "semi-active," emitting a glow in response to the play of the flame and reducing the heat sink effect. They are also significantly lighter, presenting the possibility that they could be used in a portable device. However, they suffer from their own set of limitations. These limitations arise primarily from the limitations of the vacuum-forming technique itself. All such logs will of necessity have at least one side that must remain hidden from the viewer because it has no log-like detail and is essentially a flat surface. This results because at least one side of the vacuum-mold must remain open to the slurry from which the log is made. That surface will be random and slightly lumpy because that is the way that the slurry of fibers naturally flows under the influence of the vacuum. Furthermore, in order to allow the wet fiber shape to be removed from the vacuum mold, the logs generally are restricted to those having more planar surfaces rather than the detailed, curved surfaces of natural bark-covered wood. It is far easier to give the illusion of a planar, split piece of wood than it is to create a vacuum mold that has the fully round natural shape. With considerable creativity and clever placement, the vacuum-formed logs can be made to appear more natural when burning than the heavy ceramic logs, but the illusion is still incomplete, especially so since the vacuum-formed logs have the extra restriction of being unable to achieve a full round shape. And, because the ceramic fiber logs only provide an illusion of being on fire, they still require the use of a hidden metallic tube or similar burner. The viewing area must, in many cases, be even more restricted than with the high-density ceramic logs to hide both the burner and the unnatural and incomplete shape of the logs.

In either of the logs of the current art, providing other components that typically are found in a real wood campfire is difficult or impossible. Adding, for example, a ring of rocks such as many people use around a campfire could not be easily included in with the current art. High density ceramics would simply add far too much weight if used. Vacuum-formed materials are generally so fragile that they would be very easily damaged during normal handling and normal use in a camping environment.

SUMMARY

For the foregoing reasons, there is a need for an artificial log that can does not require a burner or similar structure to produce flame, which can be arranged in a natural-looking manner without regard to hiding such a burner, and which allows the emission of a greater quantity of IR energy because the hot lower portions of the flame do not have to be obscured to hide the artificial appearance of the burner. Moreover, there is a need for an artificial log that is cooled by the flow of natural gas or propane flowing through it, and which thereby more effectively discharges heat energy during the combustion process. Such a convection-cooled log would have the further advantage of providing a stable, long lasting environment for the gas tube. Stresses, corrosion, oxidation and disbandment between the tube material and the log material would be minimal.

The present invention is directed to an apparatus that satisfies the above needs. A novel gas burning artificial log and method of manufacturing is disclosed, which does not require a burner or similar structure to produce flame; which can be arranged in a natural-looking manner without regard to hiding such a burner; which allows the emission of a greater quantity of IR energy because the hot lower portions of the flame do not have to be obscured to hide the artificial appearance of the burner; and which is sufficiently porous at the microscopic and semi-microscopic level to allow natural gas or propane flowing through it, resulting in surface flames having a more realistic appearance and also in a cooler log due to convection heat transfer from the log resulting from the gas movement through the log. The pores are sufficiently small as to provide a continuous appearance to the flame.

The gas-burning log of the instant invention is adapted for use with gas-burning fireplaces, portable "campfires," decorative patio fireplaces and other applications. The gas burning artificial log and method of manufacture of the present invention provides some or all of the following structures and manufacturing steps.

(A) An active log 20 receives a supply of gas from an external supply. A preferred active log is made of a material having sufficient microscopic porosity to allow gas to move through the material from which the log is made, typically moving from an internal location to the surface of the active log. Gas moving through the log absorbs heat energy, thereby cooling the log by convection and warming the gas prior to combustion. Gas, which is smoothly exhausted from pores on the outer surface of the log, is burned, thereby creating a realistic approximation of the appearance of a real log burning.

(B) A process for manufacturing active logs, comprising some or all of the following steps.

(a) Assembling, a liquid part A, in a preferred embodiment comprising: colloidal silica, 55–65% of final mix weight; ceramic bulk fiber, 3–5%; ½" glass needles, 1–3%; fluorocarbon wetting agent, 0.2–0.3%; and Triton X-100 or similar foaming agent, 0.6–0.8%; wherein the total % of final mix weight is approximately 67%.

(b) Assembling a solid part B, in a preferred embodiment comprising: insulating, lightweight refractory fillers, such as lightweight filler thermal insulation microspheres with thin walls, 15–17% and lightweight filler thermal insulation fly ash ceramic microspheres with thick walls, 2–4%; light weight filler of foamed silica perlite, 3–5%; light weight filler ultra light ceramic microspheres, 3–5%; anhydrous sodium silicate powder, 2–4%; anhydrous potassium silicate powder, 2–4%; wherein the total % of final mix weight is approximately 33%.

(c) Whipping the liquid part A while the solid part B is added, thereby making the mixture homogeneous and lowering the density of the mixture by the addition of air introduced by the whipping action. The introduction of air also results in the formation of microscopic pores and interconnected air pockets through the material. The whipping action is typically contained until the weight of the mixture is approximately 3.8 to 4.5 pounds per gallon.

(d) Placing the whipped mixture into a mold carrying a gas tube 40, curing the mixture and demolding.

(C) Whereby the gas tube 40, encased within the active log during the molding process, defines holes through which natural gas or similar fuel may be exhausted.

(D) A gas supply line 60, attached to the gas tube 40, provides a continuing supply of gas fuel.

(E) One or more passive logs 80, manufactured in a manner similar to that of the active logs, but having no gas tube 40, may be carried adjacent to the active logs in some applications.

It is therefore a primary advantage of the present invention to provide a novel gas burning artificial log and a method or manufacturing such logs from sol-gel compositions wherein the burner used behind or under conventional artificial logs is replaced by an active log having sufficient porosity to allow gas exhausted from a pipe carried within the log to move through the log and burn on the log's surface.

Another advantage of the present invention is to provide a ceramic material which is sufficiently porous, containing microscopic and semi-microscopic pores to allow gas to pass through it, and which is well suited for use in making artificial versions of both active logs and passive objects such as non-burning logs and rocks.

A still further advantage of the present invention is to provide an artificial log which is cooled during operation by convection cooling resulting from gas fuel moving from an inner area to the outer surface of the log and absorbing heat energy, causing the log to cool and the gas to become warmer, thereby removing heat from the log and transferring it to the room or other area to be heated. The convection cooling provides a related advantage of providing a cooler and less hostile environment for the internal parts of the log apparatus, thus extending its useful life. The convention cooling also reduces thermally induced mechanical stress between the gas tube and ceramic portions of the active log, which expand at different rates with temperature.

Other objectives, advantages and novel features of the invention will become apparent to those skilled in the art upon examination of the specification and the accompanying drawings.

BRIEF DESCRIPTION OF THE DRAWINGS

These and other features, aspects, and advantages of the present invention will become better understood with regard to the following description, appended claims, and accompanying drawings where:

DETAILED DESCRIPTION OF THE INVENTION

Figure 1:
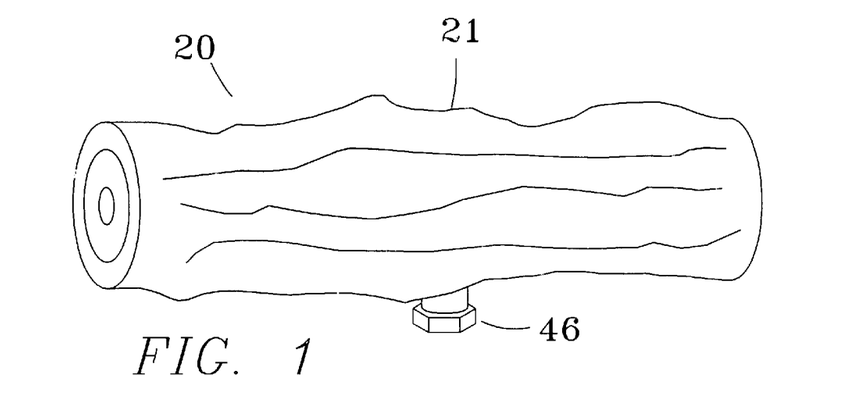
FIG. 1 is a perspective view of a version of the active log of the invention.
Figures 2, 3:
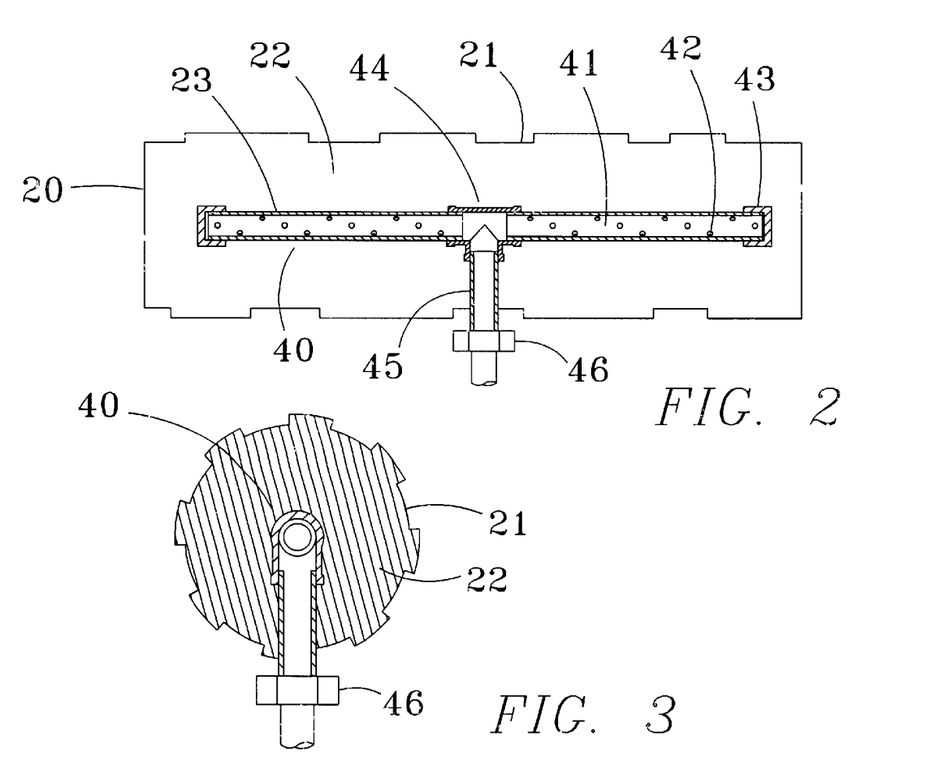
FIG. 2 is a lengthwise cross-section of the active log of FIG. 1.
FIG. 3 is a cross-sectional view of the active log of FIG. 1, taken along the 3—3 lines.

Referring in generally to FIGS. 1 through 3 and table 1, the construction of an active log 20 consistent with the principles of the invention may be understood. The active log includes a body made of porous ceramic material. A channel is defined within the active log, within which is carried a gas tube 40. A gas supply line 60 provides gas to the gas tube 40. Gas exhausted from holes defined in the gas tube moves through the porous material from which the active log is constructed, cooling the active log by convection. Due to the slightly greater gas pressure within the active log, gas moves outwardly through the porous material, until it is exhausted from pores on the surface of the active log. Contact with the ambient atmosphere results in combustion after ignition by a conventional ignition source. Because the combustion is generally uniformly distributed about the external surface of the active log, and because there is no unsightly external burner from which gas is exhausted, the appearance of the active log is a realistic approximation of the burning surface of a real log. One or more passive objects, such as logs or rocks, constructed of a similar porous ceramic material may be used to provide additional realism without the need to pipe gas to a number of gas tubes 40.

Referring to FIGS. 1–3, an active log 20 is seen. The outer surface 21 is configured to appear to be realistic, i.e. to appear to be a real log, either split or unsplit. Alternatively, the active log could be made to resemble another object, such as a pile of coal, pinecones or other flammable objects. The active log itself is made of a porous ceramic material, as seen below. A lengthwise cavity 23 carries a gas tube 40.

A key structure common to all versions of the instant invention includes the porous ceramic material from which the active log is made, which allows gas exhausted from a porous gas tube 40 contained within the active log to permeate through the body of the active log, allowing the gas to be burned on the surface of the active log, upon making contact with the oxygen present in the ambient atmosphere. As a result of this key structure, there is no conventional gas burner. The gas, moving from the inside of the ceramic active log or object to the outside, does not encounter a significant amount of oxygen until it emerges from the surface of the ceramic. This is in part because the gas pressure in the pipe 40 is greater than the ambient air pressure, preventing ambient air, and therefore oxygen, from entering the active log. At the time that the gas is discharged from the outer surface of the active log, the presence of atmospheric oxygen will allow combustion. Because the combustion is somewhat uniformly spread over the surface of the ceramic object or active log, a very realistic approximation of the surface of a burning real log results.

It is a significant design advantage that because the active log or other ceramic object is permeated with a flow of gas, the interior of the active log, including the metal parts of in the gas tube 40, fittings and other objects, tend to remain cool. First, the low thermal conductivity of the ceramic material from which the active log is made reduces the rate of heat flow into the interior of the log assembly. Second, the gas moving through the ceramic material tends to absorb heat, thereby cooling the ceramic and moving the heat outwardly by convection. Thus essentially all of the heat of combustion is released directly to the surroundings, while a small fraction of the heat is diverted to the surface to create a red-hot, glowing on portions of the log's surface. This in turn provides an efficient radiating surface from which infrared radiant heat is projected to the surroundings. Thus essentially all the heat produced is available. The sensation of a warm, heat producing fire is significantly enhanced, particularly so because the source of the flame, i.e. the log surface, is readily visible and open to the user.

The instant invention is directed to the use of porous materials with a combination of strength, porosity and castability. Lightweight and low thermal conductivity are also significant advantages. Thus ceramic materials consisting of a wide variety of compositions, and formed by either low temperature chemical reactions (such as sol-gel technologies, cementitous systems, magnesia-bonded ceramics, magnesium oxychloride bonded systems, phosphate-bonded systems, titania-bonded systems), and other chemical systems capable of providing some of the needed physical properties may be acceptable and usable as non-preferred embodiments of the instant invention. In addition, ceramics formed by other physical and chemical systems, such as vacuum-formed ceramic fiber bodies or fired ceramic compositions that result in ceramic materials may provide some of the necessary physical properties, and therefore may be acceptable and usable as non-preferred embodiments of the instant invention.

The ceramic material used to form a preferred version of an active log is selected because it is manufacturable at relatively low cost, in a manner that permits easy handling, with characteristics that are compatible with the molding process, and that are compatible with the material of the inner gas tube. Significant problems prevent the use of known ceramic materials. The material selected for use must have a high enough strength to be fully functional and sufficiently robust. It must be porous enough to allow sufficient gas flow. It must be insulative and low enough in density to provide a strong glowing effect while burning, and when desired, ready portability. Because of the possibility that outdoor use will result in the unit getting wet, the material must not be damaged by moisture or liquid water, and it must be able to be lit safely and without damage when the log material is initially wet from rain. It should not contain ingredients that provide excessive odor on initial firing. Alternatively, if such ingredients are present, they must be readily removable in some manner. For the safety and health of the workers manufacturing the log sets, it is important that the mix be non-toxic and as environmentally benign as possible. An aqueous-based system is also preferred to avoid VOC and other atmospheric emissions. The ability to control the rates and reaction times of the chemical reactions that form the ceramic is also desirable to allow easy working of the ceramic mix. Ideally, the ceramic-forming reactions would be neither severely exothermic nor endothermic. This would minimize heat related factors in the molding process. While several ceramic-forming chemical systems were tried, the preferred embodiment was the only one that provided all the attributes mentioned above.

The material used in the preferred embodiment of the invention is a liquid ceramic composition based on colloidal silica. Colloidal silica is available commercially through Nalco Chemical Co. of Naperville Ill. or Dynamit Nobel, of various United States locations. The colloidal silica mixture of the preferred embodiment is provided as a two-part formulation, Part A (liquid) and Part B (solid). To initiate the ceramic forming reactions, equivalent amounts of the Part A and Part B are measured out, preferably by weighing. The chemical process that forms the ceramic material is a variation on the general process known to those skilled in the art as "sol-gel chemistry". The preferred composition is as shown in Table 1.

TABLE 1

| Part A, Liquid: | |
|---|---|
| Colloidal silica, (50% solids, 100 nm preferred, not required) | 55–65% of final mix weight |
| Ceramic bulk fiber, needed to prevent cracks | 3–5% |
| ½" glass needles, an anti cracking agent | 1–3% |
| Fluorocarbon wetting agent | 0.2–0.3% |
| Triton X-100 (or similar) foaming agent | 0.6–0.8% |
| Total % of final mix by weight | Approximately 67% |
| Part B, Solid: | |
| Lightweight filler thermal insulation fly ash ceramic microspheres, thin wall | 15–17% |
| Lightweight filler thermal insulation fly ash ceramic microspheres, thick wall | 2–4% |
| Lightweight filler (any form of foamed silica perlite) | 3–5% |
| Lightweight filler (ultra light ceramic microspheres) | 3–5% |
| Anhydrous Sodium silicate powder | 2–4% |
| Anhydrous potassium silicate powder | 2–4% |
| Total % of final mix weight | Approximately 33% |

TABLE 2

| Part A, Liquid: | |
|---|---|
| Colloidal silica, (50% solids, 100 nm preferred, not required) | 55–65% of final mix weight |
| Fluorocarbon wetting agent (desirable, but could be omitted) | 0.2–0.3% |
| Triton X–100 (or similar) foaming agent | 0.6–0.8% |
| Total % of final mix by weight | Approximately 67% |

TABLE 2-continued

| Part B, Solid: | |
|---|---|
| Lightweight ceramic filler | 25–29% |
| Anhydrous silicate powder | 4–8% |
| Total % of final mix weight | Approximately 33% |

If desired, coloring agents can also be added to the mix. These coloring agents can be any desired colorant, but of course they agents chosen must be both heat stable and chemically compatible with the intended use of the material. If used, the colorant will, of course, alter the mix composition, which must be adjusted accordingly.

As formulated above, Part A, liquid can be prepared separately and stored for at least 1 week before use. However, with the passage of time, Part A tends to separate; as a result, care must be taken to assure that the Part A is homogeneous and representative immediately before weighing out a portion. Part B is somewhat moisture sensitive and should be stored in a dry place, and should be contained in moisture-proof containers. If such precautions are taken, part B is stable as formulated and can be stored indefinitely.

The appropriate amounts of Part A and Part B, in the ratio specified by the precise mix used within the guidelines of Table 1 are weighed out. These amounts are quickly combined in an appropriate mixing vessel. Preferably the Part B is added to the Part A while stirring vigorously. After the mixture becomes homogeneous, vigorous stirring is continued for 1–2 minutes to provide a whipping action. The end of the whipping period is detected when the volume of whipped-in air has lowered the density of the mixed material to approximately 3.8 to 4.5 lbs per gallon. This end-point can be inexpensively and quickly determined by weighing a tarred level-full paper cup of the whipped material and comparing its density with that of an identical cup filled with water (water has a density of 8.33 lbs per gallon). Thus a cup weight of 46–54% of the weight of the water-filled cup is appropriate. These weights and cup weights should be considered as guidelines only and the precise values determined by experiment, where persons experienced in the art may evaluate slight variations of the guidelines. For example, it may be desired to raise the density of a formula being used for casting passive or semi-active logs, rocks or other objects, relative to that of active logs, to achieve added strength. Lower cup weights might be used to form logs which burn with a yellowier color, compared to the darker colored flame that results from logs at the higher densities.

After the desired cup weight is reached, the whipped ceramic mixture is placed into the desired mold. This work must be accomplished quickly as the mixture begins to set within about 8–10 minutes of initial mixing. After placing in the mold, the molds are left to cure, and can be typically demolded in 6–10 hrs at room temperature. After demolding, the "green" logs or other shapes are allowed to air-dry for at least 24 hours. The drying process can be accelerated if desired by placing the parts in a warm room and by providing ample low-humidity air circulation. Where the room is approximately 120 degrees F. excellent results are typically achieved. However, at higher temperatures stress-induced cracking may result.

When the parts are dry they are ready for additional coloring and assembly into the final unit.

The unique porous ceramic material of the instant invention may be readily cast into molds derived directly from real logs, split wood, rocks or other natural or artificial shapes. Any appropriate mold making process can be utilized in conjunction with this invention. The preferred method will be described below for the case of making ceramic copies of rocks. In the case of making molds for ceramic objects of different type, the process is identical, except that the original is either split wood, a log, or other shape a copy of which is desired.

A base may be included for any ceramic object made. If it is desired to make copies of closely lying logs or logs that are touching or overlapping each other in some way, it is generally desirable to attach these pieces with screws, glue, or other fasteners, before beginning the application of the mold-making compound.

Before casting the ceramic material into the prepared mold of the log shape, a gas tube 40 or pipe, of a diameter that is approximately $1/5-2/3$ of the diameter of the log being cast is placed within the mold. This pipe, which will function to carry the gas fuel into the core of the log, is held within the mold in such a position as to coincide approximately with the axis of the log. This tube is of a length to be somewhat shorter than the mold, so the ceramic material will be at least 0.5" thick a covering the ends of the gas pipe in the finished casting. The main body 41 of the gas tube defines at least one hole, and typically a plurality of small holes 42. In a preferred embodiment, the holes are distributed both radially and longitudinally along the main body. The main tube 41 is carries end caps 43, or may alternatively be crimped shut, welded or otherwise sealed at both ends. As seen in FIG. 2, a T-fitting 44 and T-pipe 45 with a gas connection fitting 46 allow connection of a gas supply line 60 and gas supply 61.

With the gas tube 40 or similar pipe properly positioned and firmly suspended within the cavity of the mold, the 2-part mix of the porous ceramic composition is made, and is cast into the mold, burying the pipe within the ceramic, with only the fitting 46 protruding. The porous ceramic then hardens into a stable ceramic copy of the original log, and is then allowed to air dry to achieve hardness, strength and porosity. The resulting log is shown in FIG. 1.

The gas tube 40 can be seen in the cross-sectional view of FIG. 2 to be a spaced distance from the surface 21 of the active log 20. This is in contrast to the prior art, wherein combustion takes place at an orifice in a burner that is within contact of atmosphere. As a result of the spaced distance between gas tube 40 and surface 21, the gas tube remains substantially cooler than the burners used in prior art artificial log applications.

Figure 4:
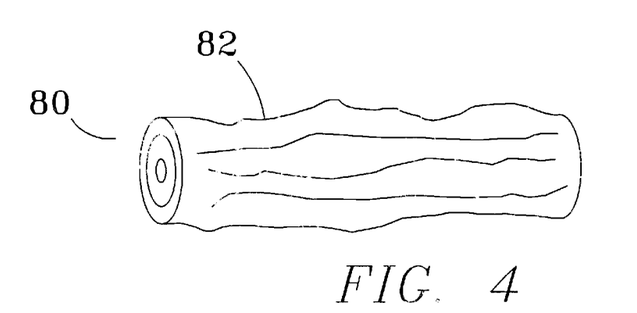
FIG. 4 is a perspective view of a version of the passive log of the invention.

Generally a log set consists of a small number, (2–4) logs with the internal pipe for fuel gas dispersion. At the option of the designer, other "semi-active" or "passive" logs, (i.e. those that glow in response to flame but provide no flame of their own) or passive logs 80 can be included. Passive logs are formed in a manner similar to that of the "burning" active logs, and in similar molds. As a result, the outer surface 82 of each object is configured in a manner to result in a realistic appearance. Passive logs 80, rocks 81 or other structures do not, of course, have the pipe 40 for distribution of the fuel gas.

Figure 5:
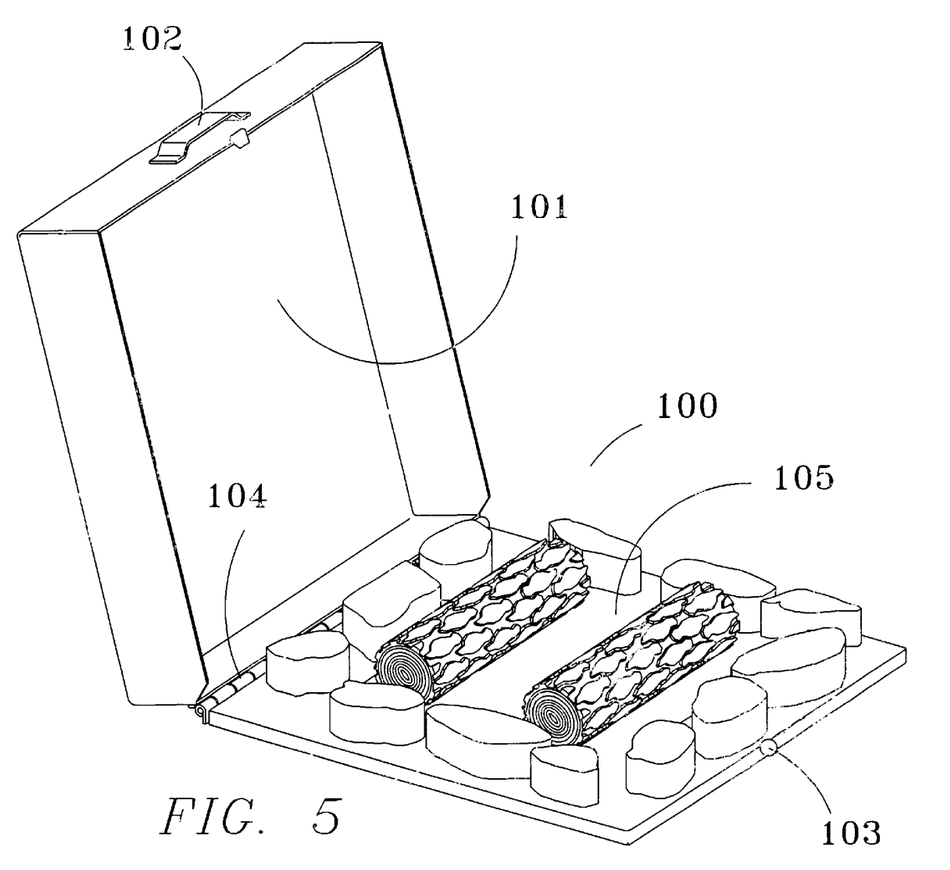
FIG. 5 is a perspective view of a version of the portable fireplace of the invention.
Figure 6:
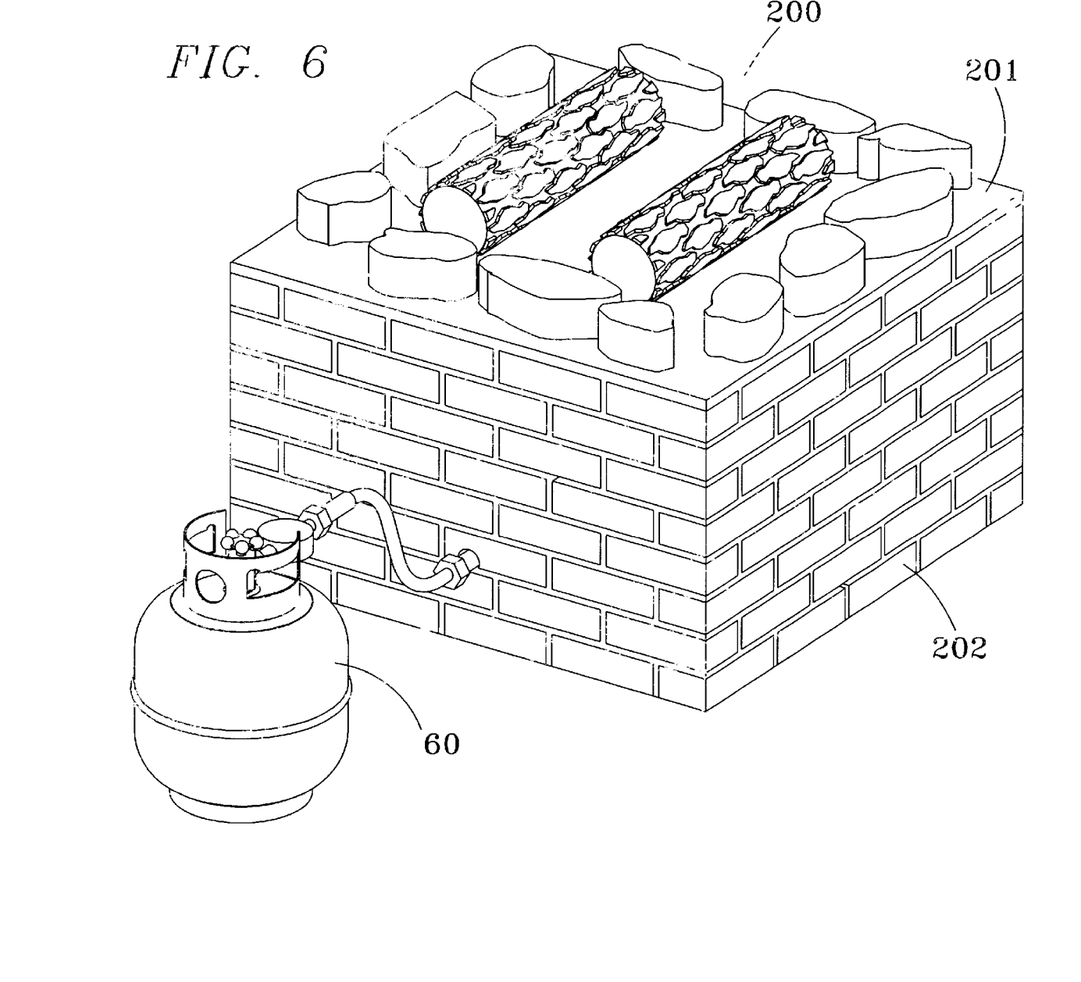
FIG. 6 is a perspective view of a version of the stationary fireplace of the invention.
Figure 7:
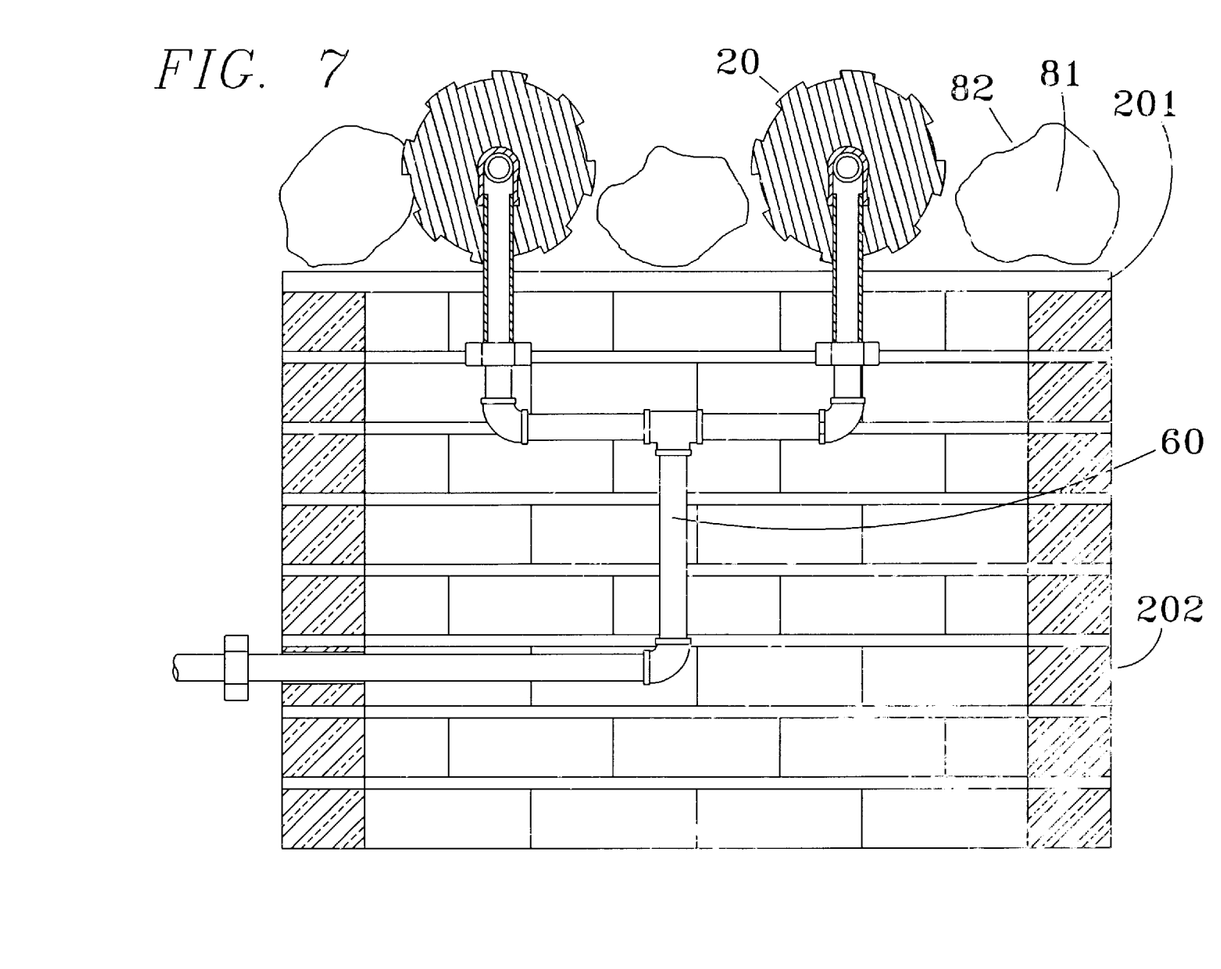
FIG. 7 is a cross-sectional view of the stationary fireplace of FIG. 6, taken along the 7—7 lines.

As seen in FIGS. 5–7, for a realistic campfire appearance, the active burning logs and the passive logs included in the set can be accompanied by a ring of lightweight, highly realistic artificial rocks, in the manner of a real campfire. The molds used to create the rocks are made by a similar process to the making of a passive log. As seen in FIG. 5, a ring of rocks may enhance a portable fireplace 100. Molds for rocks of suitable size for the intended logs are made by gluing the chosen natural rocks to a piece of suitable base stock, usually plywood.

This assembly is then coated with mold-making rubber sufficiently to make a direct copy of the rock ring and its base or the portions thereof. Such latex rubber is readily available from many sources, specifically Rub-R-Mold, Murfreesborough, Tenn. Application of the liquid latex can be done by brush, spray, dip or any other applicable technique. Numerous coats are required to achieve the necessary mold retaining shape and thickness. Drying is required between each coat, a process that is greatly facilitated in the presence of moving dry air. A simple house fan is usually sufficient to create the moving air needed for small jobs. Larger jobs involving larger or more numerous parts might require more sophisticated air moving and dehumidifying systems. Removal of the mold from the rocks and or base frees the mold to be used. The mold is placed in the inverted position and filled with the same, or similar, ceramic mixture as was used to form the logs.

When the components of the rock ring have sufficiently cured, they can be attached to a ceramic board. Eternit Corporation, of Berks Corporate Center, 210 Corporate Dr., Reading Pa. 19605 (USA) manufactures a suitable ceramic board. The components of the rock ring can be attached to the ceramic board using suitable glue. This portion of the assembly is generally sufficiently removed from the flames that high temperature resistant organic glue is usually adequate. In some designs, however, the temperature of this portion of the assembly may become hot enough that mechanical fastening means might be necessary. In those cases, bolts or other fasteners can be embedded into the wet ceramic and used to fasten the rock and base assembly together through suitably drilled holes. Other support structures such as wires or wire grid can also be used. The ceramic material is mixed and cast into the inverted mold, and while still wet the inverted base board is pressed into position, which inserts the support structures into place in the soft wet ceramic.

After the attachment of the rock ring components, a further appearance enhancement can be made by adding a layer of the ceramic mix (colored ash-gray) $1/4-1/2$ inch thick all over the area within the rock ring. Addition of a few pieces of pumice rock or other lightweight fireproof material (broken or rejected porous ceramic pieces work well) to resemble gravel or rocks embedded into the ash bed can be done while the ash bed ceramic is still wet.

When dry, the holes to allow gas access are drilled through the ash bed and through the baseboard. In a preferred embodiment, appropriate structures are added beneath the board to act as legs or as attachments for the lid, legs or other structures. The logs are placed in the bed, with the attachment pipe protruding downward through the holes in the bed, and appropriate pipe fittings and gas feed tubing and fittings are added. Hinges and latches for the lid are attached to the base. The lid is placed into position and latched into place.

As seen in FIG. 5, a portable fireplace 100 for use in campgrounds, on patios, and in other areas, is seen. A base 105 supports a plurality of active and passive logs, typically surrounded by a ring of ceramic rocks. A lid 101 having a handle 102 and fastener 103 is attached to the base by a hinge 104.

As seen in FIGS. 6 and 7, a stationary fireplace 200 is similar to the portable fireplace 100. A wall 202 supports the base 201. An external gas source 61 and supply line 60 provide gas to one or more active logs.

The previously described versions of the present invention have many advantages, including a primary advantage of providing a novel gas burning artificial log and a method or manufacturing such logs from sol-gel compositions wherein the burner used behind or under conventional artificial logs is replaced by an active log having sufficient porosity to allow gas exhausted from a pipe carried within the log to move through the log and burn on the log's surface.

Another advantage of the present invention is to provide a ceramic material which is sufficiently porous at the microscopic and semi-microscopic level to allow gas to pass through it, and which is well suited for use in making artificial versions of both active logs and passive objects such as non-burning logs and rocks.

A still further advantage of the present invention is to provide an artificial log which is cooled during operation by convection cooling resulting from gas fuel moving from an inner area to the outer surface of the log and absorbing heat energy, causing the log to cool and the gas to become warmer, thereby removing heat from the log and transferring it to the room or other area to be heated. The convection cooling provides a related advantage of providing a cooler and less hostile environment for the internal parts of the log apparatus, thus extending its useful life. The convention cooling also reduces thermally induced mechanical stress between the gas tube and ceramic portions of the active log, which expand at different rates with temperature.

Although the present invention has been described in considerable detail and with reference to certain preferred versions, other versions are possible. For example, while a preferred version of the part A and part B used in the formation of the ceramic it is clear to those trained in the art that some substitution could be made without significant effect, including some movement of the ingredients of one part to the other part, in a manner not inconsistent with the above disclosure. Therefore, the spirit and scope of the appended claims should not be limited to the description of the preferred versions disclosed.

In compliance with the U.S. Patent Laws, the invention has been described in language more or less specific as to methodical features. The invention is not, however, limited to the specific features described, since the means herein disclosed comprise preferred forms of putting the invention into effect. The invention is, therefore, claimed in any of its forms or modifications within the proper scope of the appended claims appropriately interpreted in accordance with the doctrine of equivalents.

What is claimed is:

1. A method of making an active log, comprising:
   (A) assembling a liquid part A, comprising:
      (a) colloidal silica; and
      (b) foaming agent;
   (B) assembling a solid part B, comprising:
      (a) anhydrous silicate powder;
   (C) whipping the liquid part A while the solid part B is added, thereby forming a homogeneous whipped mixture, whereby the density of the whipped mixture is lowered by addition of air;
   (D) placing the whipped mixture into a mold carrying a gas tube defining at least one hole and having a gas connection fitting; and
   (E) curing and demolding the active log.

2. A method of making an active log of claim 1, wherein the whipped mixture additionally comprises:
   (A) ceramic bulk fiber;
   (B) glass needles; and
   (C) a wetting agent.

3. A method of making an active log of claim 2, wherein the wetting agent is a fluorocarbon wetting agent.

4. A method of making an active log of claim 1, wherein the whipped mixture additionally comprises:
   (A) microspheres with thin walls;
   (B) microspheres with thick walls;
   (C) light weight filler of foamed silica perlite; and
   (D) light weight filler ultralight ceramic microspheres.

5. A method of making an active log, comprising:
   (A) assembling a liquid part A, comprising:
      (a) colloidal silica;
      (b) ceramic bulk fiber;
      (c) glass needles, 1–3%;
      (d) fluorocarbon wetting agent; and
      (e) foaming agent;
   (B) assembling a solid part B, comprising:
      (a) microspheres with thin walls;
      (b) microspheres with thick walls;
      (c) light weight filler of foamed silica perlite;
      (d) light weight filler ultralight ceramic microspheres;
      (e) anhydrous sodium silicate powder; and
      (f) anyhdrous potassium silicate powder
   (C) whipping the liquid part A while the solid part B is added, thereby forming a homogeneous whipped mixture and lowering the density of the whipped mixture by addition of air introduced by the whipping until the weight of the whipped mixture is approximately 3.8 to 4.5 pounds per gallon;
   (D) placing the whipped mixture into a mold carrying a gas tube defining at least one hole and having a gas connection fitting; and
   (E) curing and demolding the active log.

* * * * *